United States Patent [19]

Killer

[11] Patent Number: 4,569,730

[45] Date of Patent: Feb. 11, 1986

[54] METHOD FOR CONTINUOUS COATING OF A SOLID ELECTROLYTE WITH A CATALYTICALLY ACTIVE MATERIAL

[75] Inventor: Eric Killer, Wettingen, Switzerland

[73] Assignee: BBC Brown, Boveri & Co., Ltd., Baden, Switzerland

[21] Appl. No.: 692,521

[22] Filed: Jan. 18, 1985

[30] Foreign Application Priority Data

Jan. 26, 1984 [CH] Switzerland ............................ 355/84

[51] Int. Cl.$^4$ ........................ C25D 5/04; C25D 17/00
[52] U.S. Cl. .................................. 204/24; 204/224 R
[58] Field of Search ............................. 204/24, 224 R

[56] References Cited

U.S. PATENT DOCUMENTS

| | | | |
|---|---|---|---|
| 936,472 | 10/1909 | Pfanhauser | 204/206 |
| 2,540,602 | 2/1951 | Thomas | 204/224 R |
| 3,806,441 | 4/1974 | Rowe | 204/224 R |
| 4,326,930 | 4/1982 | Nagel | 204/24 |
| 4,396,469 | 8/1983 | Banziger | 204/24 |

*Primary Examiner*—T. M. Tufariello
*Attorney, Agent, or Firm*—Oblon, Fisher, Spivak, McClelland & Maier

[57] ABSTRACT

A method for continuous coating of a solid electrolyte (3) with a coating comprised of a catalytically active metal, comprising impregnating the solid electrolyte (3) (present in the form of a film comprised of a plastic polymer) with a solution of a metal salt, and electrolyzing the metal salt in a plurality of passes of the solid electrolyte (3) between two rolls (4, 5) which rolls serve as electrodes, in a water bath, wherewith at first the speed of advance of the solid electrolyte film is a relatively high value of 20 to 30 cm/min and then a lower value of 1 to 2 cm/min, and wherewith the linear current density in the line of contact between the rolls (4, 5) and the solid electrolyte (3) is at least 830 mA/cm.

13 Claims, 4 Drawing Figures

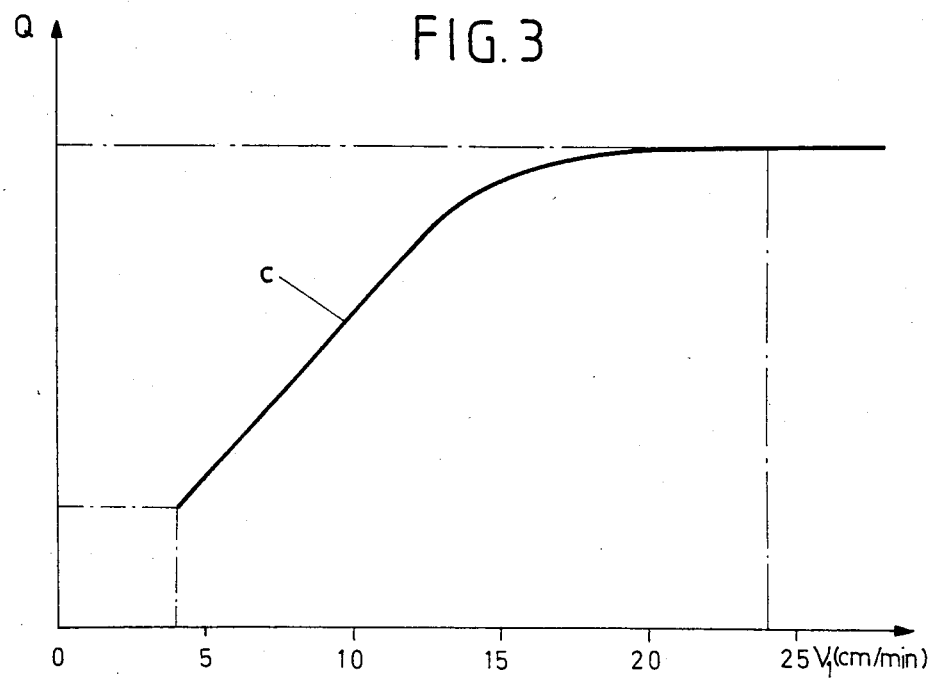
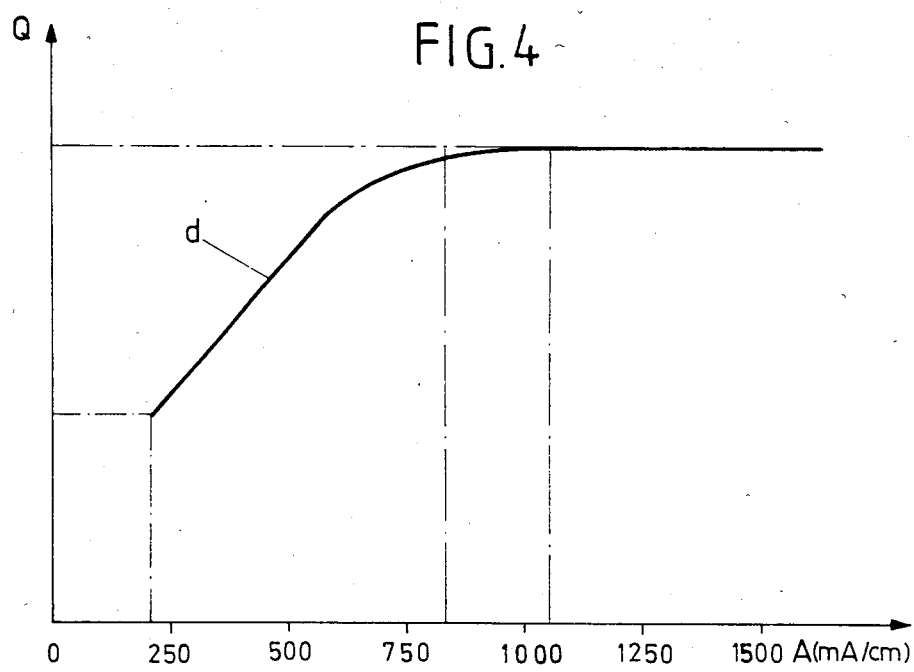

METHOD FOR CONTINUOUS COATING OF A SOLID ELECTROLYTE WITH A CATALYTICALLY ACTIVE MATERIAL

FIELD OF THE INVENTION

This invention relates to a continuous coating of a solid electrolyte.

DESCRIPTION OF THE PRIOR ART

In aqueous electrolysis, particularly in the production of hydrogen by the decomposition of water, solid electrolytes based on organic plastic materials are finding increasing use. It has proved necessary to coat such solid electrolytes, which are as a rule in the form of films, with a coating comprised of a suitable electrolysis catalyst, generally a platinum metal. Such a coating process is known from German Pat. No. 28 21 271, which relates to electrolytic deposition of the metal and to a suitable apparatus therefor. In the known process, the plastic film is first impregnated with an aqueous solution of metal salt and is then introduced into a sandwich-type electrolysis cell where electrolysis is carried out whereby the metal is deposited on the cathode.

Continuous processes and apparatuses have been developed for coating films of large area and processing large quantities of solid electrolyte film (see U.S. Pat. No. 4,396,469). In such processes, the solid electrolyte film, which has been impregnated with a metal salt solution, is passed between two rolls which are set up to act as electrodes.

By the use of the aforementioned processes, sufficiently well bonded and uniform coatings of electrolysis catalyst on the solid electrolyte are obtained. Nevertheless, there is a demand for further improvement of the bond and the structure of the coating, as well as its reproducibility, and to make these and other desirable characteristics of the coating independent of incidental and uncontrollable conditions of the manufacturing (such as the texture and constitution of the graphite-felt intermediate layer).

SUMMARY OF THE INVENTION

The object of the invention is to refine and improve the electrochemical process for continuous coating of solid electrolytes with electrolysis catalysts, which process is described in U.S. Pat. No. 4,396,469. The inventive process ensures wear-resistant, mechanically and chemically stabile and resistant coatings (or platings) which are distinguished by stabile behavior over long periods of time and by low cell voltage in electrochemical cells.

This object is achieved according to the method for the continuous coating of a solid electrolyte according to the present invention.

The present invention provides a method for the continuous coating of a solid electrolyte with a coating comprised of catalytically active metal. The solid electrolyte which is in the form of a film is impregnated with a solution containing the metal as a salt. The solid electrolyte is then rinsed in water and subjected to an electrolysis process in a cell supplied with distilled water. The cell comprises a tank containing two rolls as electrodes, a carbon felt and a water bath. The method of the invention is characterized in that the solid electrolyte is passed between the rolls at least once at a speed of a least 15 cm/minutes and not more than 30 cm/minutes. The solid electrolyte is passed between the rollers at least one additional time at a speed of at least 1 cm/minute and not more than 2 cm/minute. The linear current density referred to the contact line between the rolls and the solid electrolyte is at least 830 mA/cm.

It has been discovered, quite surprisingly, that the speed of advance of the substrate and thereby the deposition conditions play a very significant role in the electrolytic reduction of the metal salt to the metal. The characteristics of the process of formation of the metal particles in the region of the surface of the solid electrolyte depend overwhelmingly on the current density and the time. In a first (and possibly second) pass of the solid electrolyte film through the rolls with relatively high speed, very small crystal grains are formed in the region of the surface. In a subsequent pass at lower speed, these grains grow together to form an extremely strongly adhering surface layer. In this connection, quite specific bonds for the practicable values of the speed and the current density can be established.

BRIEF DESCRIPTION OF THE FIGURES

The invention will be described in more detail hereinafter, with the aid of exemplary embodiments which are further elucidated and illustrated by the drawings.

FIG. 3 is a plot of the dependence of the quality of the coating on the first speed of advance; and FIG. 4 is a plot of the dependence of the quality of the coating on the linear current density.

DESCRIPTION OF THE PREFERRED EMBODIMENTS

Figure 1:
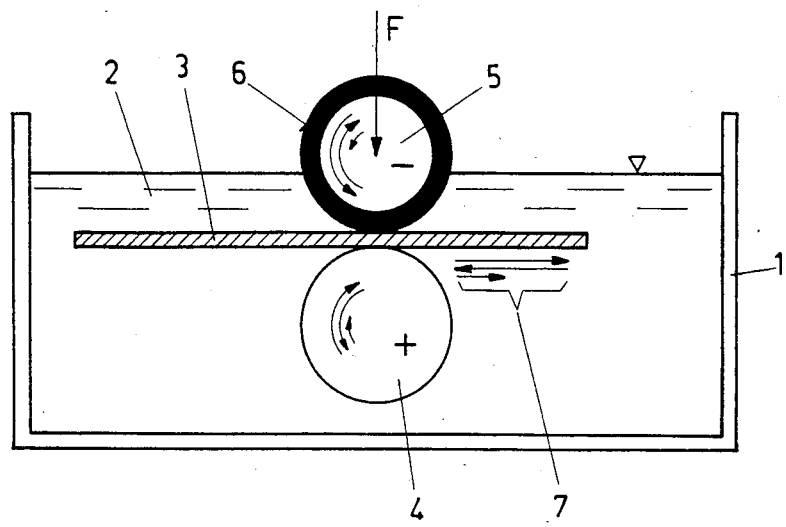
FIG. 1 is a schematic cross sectional view through an arrangement for carrying out the inventive process.

FIG. 1 shows schematically an apparatus suitable for carrying out the inventive process. A water bath 2 comprised, e.g., of distilled or fully desalinated water is disposed in a rectangular tank 1 which tank may be comprised of, e.g., polypropylene material. The electrodes are in the form of two rolls 4 and 5, which are advantageously oriented horizontally. The lower, anode roll 4, which preferably is comprised of platinized titanium material, is completely immersed in the water bath 2, while the upper, cathode roll 5, which advantageously is comprised of corrosion-resistant steel material, is only immersed in the water in the electrolysis region. The solid electrolyte 3 which is to be coated, which is in the form of a film, is disposed between the two rolls 4 and 5 with a carbon felt 6 interposed on the cathode side. In the present example, the felt 6 extends entirely around the roll 5, coaxially to said roll, and is securely affixed to the roll 5 by means of a plastic adhesive (e.g., epoxy resin). The compression force is indicated by vertical arrow F. The arrows 7 represent the speed vectors of the movement of the solid electrolyte 3 which electrolyte, as mentioned, is in the form of a film. In the present example, the course of movement is comprised of a forward and a backward pass at relatively high speed followed by a forward pass at lower speed.

Figure 2:
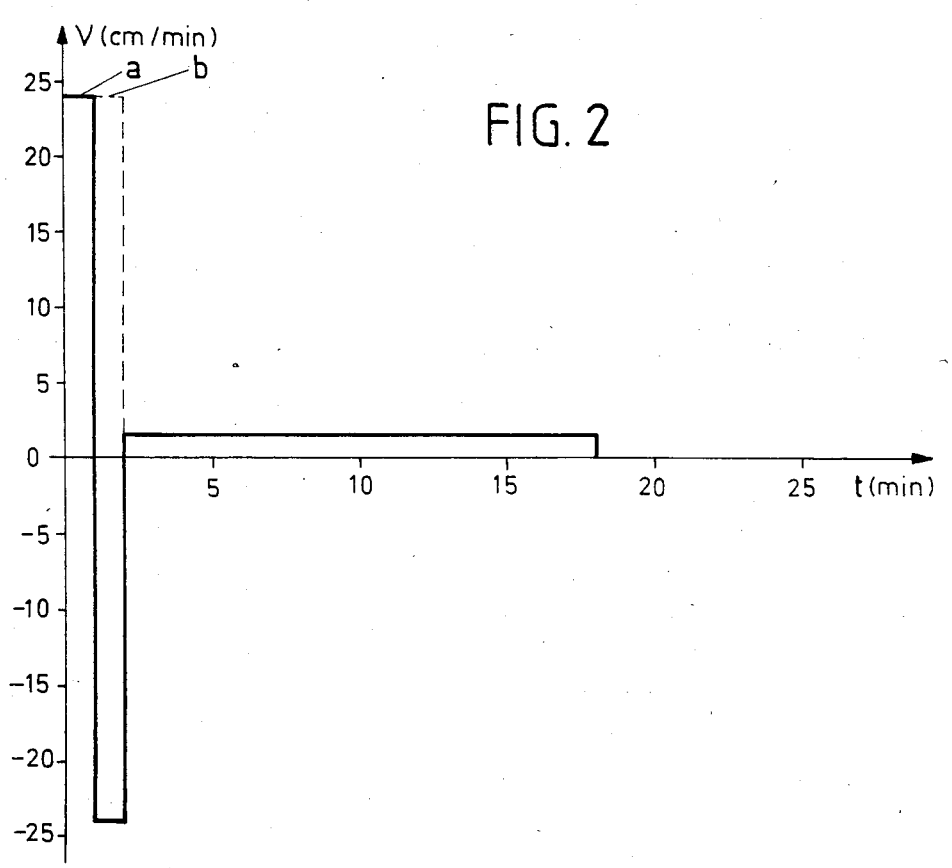
FIG. 2 is a plot of the inventive time-dependence of the speed of advance of the solid electrolyte film.

FIG. 2 is a plot of the time-dependence of the speed of advance of the solid electrolyte 3. The bold curve "a" represents the normal process according to the invention (see arrows 7 in FIG. 1). The dotted curve "b" indicates a variant with electrolytic deposition process movements in only one (the forward) direction. The direction of movement per se does not theoretically play any role; the choice of the variant is based on practical considerations.

FIG. 3 is a plot of the dependence of the quality of the coating of the solid electrolyte 3 on the first speed of advance $v_1$. For each test, this speed was held constant for a forward and a backward movement, which were then followed by an additional forward movement at a second speed, $v_2$, which was the same for all tests, viz. 1.5 cm/min. The curve "c" connects the mean values from a number of tests. The quality "Q" entered in each case is some characteristic property evaluated on an arbitrary scale. The properties drawn upon (among others) for this included the strength of bonding of the coating, the uniformity and homogeneity of the coating, non-dependence of the bonding strength, uniformity, and homogeneity of the coating on the texture and quality of the carbon felt 6 encasing the upper (cathode) roll 5, the thickness of the metallic coating at a given weight per unit surface, and the luster of the metallic coating. All the quality parameters Q initially increase monotonely from a minimum to a maximum, with increasing first speed of advance $v_1$. This maximum is achieved at c. 17.5 cm/min. Further increase of the speed $v_1$ does not result in any further improvement of the quality of the coating.

FIG. 4 is a plot of the dependence of the quality of the coating of the solid electrolyte 3 on the linear current density A. The linear current density (in units of mA/cm) is defined as the current passing through the solid electrolyte 3 per unit of length of the contact line of the rolls. (Note that the length of the contact line of the rolls equals the width of the solid electrolyte 3). The other parameters investigated were kept constant for the generation of this plot. In each case, i.e., for each value of A, the result was obtained with the following speed sequence: a speed of 24 cm/min for a forward and a backward movement, followed by a speed of 1.5 cm/min for an additional forward movement. The quality parameters Q are defined as discussed above in connection with FIG. 3. In FIG. 4 Q also proceeds monotonely to a maximum, which occurs at about 830 mA/cm (corresponding to a total current of c. 20 amp line 24 cm long, in the present example); and Q remains practically constant for further increases in the linear current density A.

Exemplary Embodiment I (see FIGS. 1 and 2)

The apparatus shown schematically in FIG. 1 was used to carry out the process.

For the solid electrolyte 3 which was to be coated, a film comprised of an expanded plastic polymer material, trade name "Nafion 120", based on a perfluorinated sulfonic acid (supplied by DuPont) was chosen. The film had a face area of 24 cm square, i.e., area 576 $cm^2$: on each of its two faces and a thickness of 0.2 mm. Prior to use in the process, it was impregnated 30 min at ca. 80° C. in a 0.5 wt.% solution (in distilled water) of $Pt(NH_3)_2(NO_2)_2$ (platinum dinitrite diammoniate). Following the impregnation, the solid electrolyte 3 was removed from the solution and was washed with distilled water. Then the solid electrolyte 3 was subjected to an electrolysis process in the apparatus of FIG. 1 wherein the solid electrolyte was passed a plurality of times between the rolls 4 and 5, according to the program associated with FIG. 2.

The total compression force F of the springs was about 220 Newton; the current was 25 amp (corresponding to a linear current density of 1040 mA/cm). The speed of advance v followed curve "a" (namely, for the first pass (forward) and the second pass (backward) it was 24 cm/min, and for the third pass (forward) it was 1.5 cm/min). The water bath temperature was 25° C.

Following the electro-deposition process, the solid electrolyte 3 was treated in 1N HCl for 30 min at 80°–90° C., then washed with distilled water and dried.

The appearance of the platinum coating was not dependent upon the carbon (graphite) felt 6 employed. The texture of the felt 6 was not reflected (i.e., was not reproduced to any extent) in the platinum surface. The latter had a uniform, homogeneous appearance (with respect to, e.g., reflectivity and luster).

The strength of the bond of the platinum layer to the substrate was found to be outstanding. Particles could not be rubbed away with the fingertips, and in a separation test with Scotch brand adhesive-coated tape no particles came free onto a piece of the tape pressed against the platinum coating. An epoxy resin ("Araldite Rapid" brand) was applied to the platinum surface and was hardened for 8 hr at room temperature. In a subsequent separation test, i.e., wherein the film of epoxy resin was peeled away, no platinum particles could be detected adhering to the epoxy resin.

Exemplary Embodiment II

The same procedure was followed as in Exemplary Embodiment I, but the program of movement of the solid electrolyte according to curve "b" of FIG. 2 was followed, wherewith the speed of advance v of the solid electrolyte 3 was as follows: for the first pass and second pass (both forward) it was 24 cm/min, and for the third pass (also forward) it was 1.5 cm/min.

The results were the same as with Exemplary Embodiment I. It was thus not possible to detect any dependence of the quality of the platinum coating on the direction of advance of the solid electrolyte 3.

Exemplary Embodiment III (see FIG. 3)

A fairly large number of square pieces of film 24 cm on a side were cut from the solid electrolyte stock 3, and these were treated as in Exemplary Embodiment I, except that the first speed of advance in the electrolysts process, $v_1$ was varied in different tests, between 4 cm/min and 30 cm/min, wherewith in each case the said speed was held constant for one forward and one backward pass (corresponding to the first and second steps).

The result is represented qualitatively (not quantitatively) in the plot of FIG. 3. The quality parameter Q of the platinum coating increases monotonely with increasing speed of advance of the solid electrolyte, and approaches a maximum value which is not thereafter improved with further speed increases. The characteristics investigated was particularly the strength of bonding of the platinum to the substrate, as tested by the rubbing, Scotch adhesive tape, and epoxy resin tests.

Exemplary Embodiment IV (see FIG. 4)

In order to determine the dependence of the quality Q of the platinum coating applied to the solid electrolyte 3 on the current density of the electrolysis process, similarly to the methodology of Exemplary Embodiment III a number of identical pieces of film were subjected to linear current densities A which increased in sequence, being held constant in each given test but being changed from test to test, within the range 210 mA/cm to 1040 mA/cm (corresponding to a range of total current of 5 amp to 25 amp). At ca. 830 mA/cm (corresponding to total current 20 amp), the maximum quality level was substantially reached (for all practical purposes).

Additional tests were carried out, the overall result of which was that in general one must employ a linear current density of at least 830 mA/cm for all passes of the solid electrolyte 3, a first speed of advance of at least 15 cm/min and at most 30 cm/min (since higher speeds do not increase the quality, and at best lead to technological problems), and a second speed of advance of at least 1 cm/min and at most 3 cm/min. If the solid electrolyte is run through in only a single pass at the high speed, the optimum quality is not achieved. Optimum quality is achievable only with a repeated pass at a speed of at least 17.5 cm/min (see the examples, supra). Any increase of the linear current density substantially beyond 1040 mA/cm does not lead to further improvement in the quality of the platinum coating, but does lead to substantial technological problems. Optimum results were achieved with a forward pass at 24 cm/min, a backward pass at 24 cm/min, and a second forward pass at 1.5 cm/min, all at a linear current density of c. 1040 mA/cm (see Exemplary Embodiment I).

The inventive process enables production of very strongly bonded layers of catalytically active metals, particularly noble metals, on films of plastic polymer material employed as solid electrolytes for electrochemical cells, which metal layers have optimal properties with regard to homogeneity, uniformity, and behavior over a long period.

I claim:

1. A method for continuous coating of a solid electrolyte with a coating comprised of catalytically active metal, wherein the solid electrolyte, which is in the form of a film, is impregnated with a solution containing the metal as a salt, is rinsed in water, and is subjected to an electrolysis process in a cell supplied with distilled water, which cell comprises a tank containing two rolls as electrodes, a carbon felt and further containing a water bath; said method being characterized in that the solid electrolyte is passed between the rolls at least once with a speed of 15 cm/min minimum and 30 cm/min maximum, and at least one additional time with a speed of 1 cm/min minimum and 2 cm/min maximum; and in that the linear current density referred to the contact line between the rolls and the solid electrolyte is at least 830 mA/cm.

2. The method of claim 1, characterized in that the solid electrolyte is passed between the rolls at least two times with a speed of at least 17.5 cm/min, and an additional time with a speed of 1.5 cm/min.

3. The method of claim 1, characterized in that the solid electrolyte is passed between the rolls once with a speed of 24 cm/min in one direction, once with a speed of 24 cm/min in the opposite direction, and once with a speed of 1.5 cm/min in the original direction.

4. The method of claim 1, wherein the rolls are oriented horizontally.

5. The method of claim 1, wherein the anode roll is comprised of platinized titanium material.

6. The method of claim 5, wherein the anode roll is completely immersed in the water bath.

7. The method of claim 1, wherein the cathode roll is comprised of a corrosion resistant steel mterial.

8. The method of claim 1 wherien the cathode roll is situated above the anode roll.

9. The method of claim 1, wherein the carbon felt is interposed between the cathode roll and the solid electrolyte.

10. The method of claim 9, wherien the carbon felt extends entirely around the cathode roll.

11. The method of claim 10, wherein the carbon felt is disposed coaxially to the cathode roll and securely affixed thereto.

12. The method of claim 1, wherein the film comprises an expanded plastic polymer material based on a perfluorinated sulfonic acid.

13. The method of claim 1, wherein the metal comprises $Pt(NH_3)(NO_2)_2$.

* * * * *